(12) United States Patent
Hey et al.

(10) Patent No.: US 10,704,206 B1
(45) Date of Patent: Jul. 7, 2020

(54) SUB-IRRIGATED TENNIS COURT

(71) Applicant: Har-Tru, LLC, Charlottesville, VA (US)

(72) Inventors: Roy Hey, Charlottesville, VA (US); Sandra Humphreys Hunt, Stuarts Draft, VA (US); Derwood Stephen DeLong, Goochland, VA (US)

(73) Assignee: Har-Tru, LLC, Charlottesville, VA (US)

( * ) Notice: Subject to any disclaimer, the term of this patent is extended or adjusted under 35 U.S.C. 154(b) by 0 days.

(21) Appl. No.: 16/551,050

(22) Filed: Aug. 26, 2019

Related U.S. Application Data

(63) Continuation of application No. 16/239,590, filed on Jan. 4, 2019, now Pat. No. 10,435,851.

(60) Provisional application No. 62/616,722, filed on Jan. 12, 2018.

(51) Int. Cl.
*E01C 13/02* (2006.01)
*A63C 19/00* (2006.01)
*A01G 25/06* (2006.01)

(52) U.S. Cl.
CPC .............. *E01C 13/02* (2013.01); *A01G 25/06* (2013.01); *A63C 19/00* (2013.01)

(58) Field of Classification Search
CPC ........ E01C 13/02; E01C 13/083; E01C 13/06; A01G 25/06; A63C 19/00
See application file for complete search history.

(56) References Cited

U.S. PATENT DOCUMENTS

| | | |
|---|---|---|
| 3,908,385 A | 9/1975 | Daniel et al. |
| 4,576,511 A | 3/1986 | Vidal, Jr. |
| 4,606,963 A | 8/1986 | Farrell |
| 4,832,526 A | 5/1989 | Funkhouser, Jr. |
| 4,881,846 A | 11/1989 | Burkstaller |
| 5,074,708 A | 12/1991 | McCann, Sr. |
| 5,120,157 A | 6/1992 | Todd, Sr. et al. |
| 5,222,831 A | 6/1993 | Todd, Sr. et al. |
| 5,427,473 A | 6/1995 | Todd, Sr. et al. |
| 5,938,372 A | 8/1999 | Lichfield |
| 2008/0098652 A1 | 5/2008 | Weinbel |

OTHER PUBLICATIONS

PCT Patent Application Serial No. PCT/US19/12254;Notification of Transmittal of the International Search Report and the Written Opinion of the International Searching Authority; dated Apr. 1, 2019; 7 pages.

*Primary Examiner* — Carib A Oquendo
(74) *Attorney, Agent, or Firm* — John H. Thomas, P.C.

(57) ABSTRACT

A sub-irrigation system includes a special water distribution assembly that is able to rapidly disperse water underneath a court surface. The system has a water distribution assembly with a water channel and permeable fabric covering. The system also includes an electronic control system to monitor and maintain a desired moisture content of a court. Inevitable variations resulting from manual and gravity fed water control only are moderated or eliminated by the automatic control herein.

25 Claims, 10 Drawing Sheets

SUB-IRRIGATED TENNIS COURT

This application is a continuation of U.S. patent application Ser. No. 16/239,590, filed on Jan. 4, 2019, which application claims the benefit of U.S. Provisional Application No. 62/616,722, filed on Jan. 12, 2018, which are both incorporated by reference herein in their entirety.

The field of the invention is clay and artificial clay tennis courts or similar clay courts generally. Specifically, the invention is directed to a new irrigation system for hydrating the court surface for consistent play on the court. The irrigation system feeds water into the surface material through a hydration system that is positioned under the surface of the court.

BACKGROUND

Clay tennis courts are made up of fine particles including, for instance, crushed meta-basalt stone that has a specification of certain size stone particles that are angular in shape. These angular stone particles seat on each other locking in to give a stable and firm surface. Water is added through different irrigation methods which is essential to this firming action of the surface. Consistent water delivery is important as the clay surface is like a sponge and will absorb the water. Too much water in an area of the court will produce puddling and create a soft spongy surface whereas too little water will create dry hard or unstable areas in the court. A properly watered court surface will keep the surface stable and firm, provide better traction, minimize surface erosion and produce better and more consistent ball bounce.

Court hydration and drying is constant throughout the life of a clay court surface. Weather conditions have to be met with appropriate actions throughout the day. On a hot day, the surface will need to have more hydration as opposed to a cooler day when the surface will need less water. Rain or a thunder storm can provide hydration, but the court can only accept limited amounts of water as most will runoff and drain due to a court's slope which allows the water to drain off leaving some moisture to seep into the clay surface and down through the profile. A healthy clay surface with the right slope angle will absorb an appropriate amount of water while shedding excess water. Too much absorption leaves the court soft and spongy and unplayable until the surface dries out. A clay surface that experiences too little hydration will become unstable or hard which can lockup the surface profile inhibiting water to pass down through it.

Water storage in a clay court is important. There is normally a stone screening base that is able to store water as rain or irrigation occurs. Water will penetrate down through the clay surface profile and be stored within the stone screenings. During the day, capillary action will occur as the sun pulls the moisture up through the surface, keeping the surface moist and hydrated as long as the moisture is in the profile.

Early court hydration systems consisted of an above ground sprinkler system. This type of system is still being used to water clay court surfaces although the number of courts using this system is slowly declining. Above ground irrigation consists of sprinkler heads placed in a specific pattern which allows the water to spray throughout the surface. A good sprinkler system will consist of 8 sprinkler heads. The spray from these sprinkler heads is only as good as the water pressure pushing the spray out to the courts. Too little water pressure does not allow the spray patterns to meet each other causing dry areas around the play area. Too much water pressure can move clay particles around causing an inconsistent surface and can also cause water puddles to occur which can stop play until the puddles have dissipated. Usually there are multiple zones in the system so that water pressure can be controlled by having only 3 or 4 sprinkler heads working at a time. It is rare to have all sprinkler heads operating at one time. Going through this process of each zone coming on is time consuming. Usually a clay court will need hydrating in the mornings before play, in the afternoons and then again in the evenings. Busy facilities do not like to shut down the courts during the afternoon as this costs them an hour or two of court usage.

Above ground irrigation is also not efficient as water waste usually occurs. If not timed correctly, water usage can be a large expense. Water that does not penetrate into the surface will drain off. This excess water is wasted. Another way water is wasted in this system is wind. Wind can push the water spray off of the courts not allowing the consistent water spray pattern that is desired. The goal of watering a clay court surface using an above ground irrigation system is to get the appropriate amount of water down through the profile so that water is stored for the days play as capillary action pulls the water up through the clay surface during the course of the day. It takes time for water to penetrate down through the clay surface using an above ground sprinkler system. This is not an efficient way to hydrate a clay court.

One current clay court sub-irrigation system was designed when irrigation technology consisted of mostly manual controls relying on user experience and knowledge to keep a clay court surface at a desired state. This prior system consists of utilizing gravity to slowly feed the underground cells water that needs to be maintained at a level in the stone screenings that then is wicked up into the fine particle surface layer. Many clay tennis courts are built using some form of sub-surface irrigation, and the number of these courts continues to grow. Prior art sub-irrigation systems operate on a gravity fed water source. A regulation tennis court is 60'×120'. This area is divided into independent water storage cells underneath the clay court surface. There is a matching water control box for each of the cells. These individual operating cells are important as tennis courts have trees and shrubbery surrounding the courts. This allows different environments to occur as you have sun and shade occurring at the same time. More sun means more capillary action which means more hydration needed. Shaded areas need less hydration. Having typically six individual working cells allow users to accommodate for these inconsistent environments on a tennis court. The water control boxes consist of a water source and water level control as well as drainage outlets. Using a float valve borrowed from the toilet industry placed in the control box allows the water level in the control box to be adjustable through a manual process. Adjusting the float device up or down gives the ability to control the water level in the control box. Since this water control box is at the same elevation as the water storage cell underneath the court surface, gravity will slowly balance between the water control box and the cell. This is a time-consuming process and has to be done slowly in order to not flood the cell or the surface. This process changes throughout each season as different water levels are needed in the cells due to seasonal environmental changes. This system has a costly, difficult to install, control system that is slow to react and unintuitive to control or adjust. There is usually a learning curve for the maintenance staff to learn and operate and usually these types of prior art systems are only mastered by experienced users.

SUMMARY OF THE INVENTION

Accordingly, it is an object of the present invention to provide a more efficient and responsive sub-irrigation system that is able to be managed by inexperienced users in addition to experienced users. The system may include the use of an improved water distribution assembly, a pressurized water supply, and careful electronic water level monitoring and water supply.

In one example, a sub-irrigated tennis court system comprises a tennis court comprising a plurality of cells, wherein each cell includes a substantially watertight reservoir and the reservoir is lined on its bottom and sides with a water impermeable layer. The system includes a water distribution assembly having a water channel, a top permeable fabric flap, and a water feed pipe. The water channel is a three-dimensional sheet having an open structure that enables free flow of water therethrough. The water feed pipe has a plurality of openings along its length. The water channel is positioned under the permeable fabric flap, and the water feed pipe is positioned adjacent the water channel once the water distribution assembly is placed on the bottom of the cell reservoir. A layer of screened aggregate is placed in the cell and on and around the water distribution assembly and up to a substantially uniform height above the water distribution assembly, wherein the screened aggregate is large enough that there is empty space in between the stones of the screened aggregate through which water may flow. A top layer of fine particles through which water may be dispersed by capillary action is placed over the screened aggregate, and an electronic control system opens and closes water flow into the water feed pipe to control the amount of water delivered to the water distribution assembly and subsequently into the screened aggregate layer whereby water may be drawn into the top layer from below.

In the above example, the electronic control system may include a water level sensor in a water level reservoir, wherein the water level reservoir is connected by a return pipe to a drain pipe that is positioned in the cell, and wherein the water level sensor controls water turn off and turn on by sending signals to a controller which in turn sends signals to a solenoid that controls a water supply valve. The water distribution assembly may further comprise a fabric sleeve fixed to a length along a side of the water distribution assembly, and wherein the water feed pipe is positioned inside the fabric sleeve. The water source may provide water to the water distribution assembly under pressure greater than one psi. The system may further comprise a water usage meter positioned on each water feed line that feeds water to each cell and is operatively connected to the electronic control system. The electronic control system may include a memory that stores the amount of water usage by each cell over time. The cell may be sloped so that the cell has a high side and a low side, and a drain pipe may be positioned in the cell on the low side of the cell, and wherein the drain pipe is operatively connected by a return pipe to the water level sensor in a corresponding water level reservoir in the electronic control system. The electronic control system may be positioned adjacent to the tennis court, and the electronic control system is housed in a cabinet that includes the water level reservoirs. The three-dimensional sheet may have a flat base and upwardly extending dimples. The cell may be sloped so that the cell has a high side and a low side, and the water feed pipe is positioned on the high side of the water feed assembly, and further comprising a drain pipe that is positioned in the cell on the low side of the cell, and wherein the drain pipe is operatively connected by a return pipe to the water level sensor in a corresponding water level reservoir in the electronic control system. The water feed pipe may be a perforated pipe. The drain pipe may be a perforated pipe.

DETAILED DESCRIPTION

The system described herein improves the process of hydration, and importantly, the rapid and consistent hydration of a clay court. The discussion herein is directed to the example of a clay tennis court, but the system is not limited to tennis courts only. Any clay playing court or surface could benefit from the use of the present irrigation system. The system includes a special water distribution assembly that is able to rapidly disperse water underneath a court surface. The system also includes an electronic control system to monitor and maintain a desired moisture content of a court. Inevitable variations resulting from manual and gravity fed water control only are moderated or eliminated by the automatic control herein.

The sub-irrigation system incorporates multiple different components that are discussed generally in the following. Specific examples are shown in the drawings and related description.

Each court is built with a sub-base foundation in order to provide and maintain stability to the court. The particular sub-base foundation that is used for each court will depend on the location and the physical circumstances of that location. A court designer can design specific site preparation steps. Like conventional clay courts, the court is expected to be sloped about 1" in 30', or something similar, so that water will not pool anywhere on the court.

In the example of a tennis court, this system described herein may utilize a conventional six cell undersurface configuration. The cells are formed in and on the sub-base foundation. A particular court size or location may favorably call for fewer or more cells underneath the surface of a court, for example, one to ten cells or more may be used. The use of multiple cells will allow for multiple environmental conditions to have the capability to adjust hydration in individual areas on the court, independent of each other. A water table is maintained undersurface to keep the top layer of fine particles hydrated. In the six cell, tennis court example, an impermeable layer of 20 mil plastic pond lining material is used and placed onto the prepared sub-base foundation to create each 20'×60' cell. Each cell has to hold water in order to store as required. The impermeable liner covers the bottom of the cell as well as the sides of the cell up to the fine particle layer. In one example, the side walls are about five inches tall, or alternatively about 4 to 6 inches.

Positioned in each cell and on the liner at the bottom of the cell is one or more water distribution assemblies. In the example of a 20'×60' cell for a tennis court, two separate water distribution assemblies are used. In each case of this example, the water distribution assembly is 4' wide×58' long and includes a sleeve attached to the water distribution assembly. This sleeve is used to contain a water feed pipe and ensure sediment does not enter the water feed pipe and water distribution assembly hindering water movement through the water distribution assembly, into the aggregate stone, and to the fine material that makes up the court surface. The sleeve is positioned anywhere on the water distribution assembly—on one or both ends, on one or both sides or anywhere on top of the water distribution assembly. In one example, the sleeve is positioned along the length side of the water distribution assembly that will be on the high side of the cell. On the low side of the water distribution assembly is a fabric flap overlap used to wrap and contain a drain pipe to again ensure sediment does not enter the basin and create a blockage. The water distribution assembly may alternatively be referred to as a sheet drain assembly especially in an example of a plastic sheet that may form a part of the distribution structure.

The water distribution assembly is a composite structure. The inside component is a water channel. The water channel is a three-dimensional open structure having a width, length and height, that enables the substantially free flow of water across the width, length and height of the water channel. In other examples, the water may also flow downwardly if the bottom of the three-dimensional structure is open or has openings therein. The water channel may have a height of from about $\frac{1}{8}^{th}$ to two inches. This three-dimensional structure may be formed of a plastic sheet with a three-dimensional feature formed therein or may also be formed of rigid tiles or set pieces known in sport court or water drainage systems generally. In one example, a solid plastic sheet has three dimensional dimples formed therein. In this example, this plastic sheet is solid and impermeable and has dimples that have a height of ½ of an inch. The plastic sheet could alternatively be permeable with a pattern of apertures punched through it, and the height of the dimples may be different or may even be variable within the particular plastic sheet. In one example, the plastic sheet is formed of polypropylene having a thickness of 0.03 inches. Other plastic materials and thicknesses may be used. It is only important that the dimples, or other three-dimensional height structure, have enough rigidity that the plastic sheet will substantially maintain its height within the sub-court structure where stone and fine materials will be poured around and on top of the plastic sheet. The open space between the dimples allows water to flow freely around the dimples and all across the plastic sheet. Other water channels formed from different three-dimensional height sheet structures may define other open structures.

In addition to the water channel, for example the plastic sheet with dimples, there is at least one layer of a permeable fabric that is placed on the top of the plastic sheet. The permeable fabric allows water to flow freely through it, but it prevents dirt and silt from passing through and filling the spaces in the water channel between the open structure including the dimples of the plastic sheet. In one example, the permeable fabric flap is formed of woven PVC having a thickness of about 0.05 inches. Other permeable fabrics, both woven and nonwoven, may be used. The permeable fabric or fabric flap may still also be in the form of a screen, both plastic or metal, that likewise prevents dirt or sand from passing through and filling the water channel. A second layer of permeable fabric may also be placed on the bottom side of the plastic sheet to cushion the plastic sheet and to facilitate water flow around the entire plastic sheet, especially in the example of a perforated plastic sheet. The fabric sleeve that runs down a side of the water distribution assembly and that will house the water feed pipe is also formed of this permeable fabric. Similarly, the drain pipe may be positioned anywhere around the water distribution assembly, but in one example it is placed on the low side of a sheet drain and is also covered by a permeable fabric to keep from being clogged by dirt or silt. The fabric sheet may be simply laid next to the water channel. Alternatively, the permeable fabric may be attached to the water channel by adhesive, heat welding, or some mechanical means.

Once the water distribution assembly is placed in the cell, a connecting pipe header is put in place at the head of each cell and connected to a water feed pipe or feed line. In one example, a feed line is made of 1" perforated pipe on the high side of each sheet drain and running along the side of the sheet drain 58' while being maintained within a specially designed pipe sleeve attached to the sheet drain, while on the lowest side of the cell a 3' perforated return pipe is installed to allow excess water to feed back through a return line and shut off the individual cell and stop water from flowing until water is needed again. The feed lines into the cell and the drain return lines out of the cell are solid pipes. The feed section of the pipe in the sleeve is perforated to disperse water along the entire length of the sheet drain. Similarly, the drain pipe is perforated to allow water to run into it so that excess water is removed from the system. The size of the piping can vary. It can be different for different portions of the system, or the size can be uniform. Different courts and environments may call for different sized piping. This process is continued for each of the 6 cells on the court.

The water feed pipe is described above as being perforated along its length. Alternatively, there may be a plurality of openings that are formed at specified spacing along the feed pipe length. The water feed pipe is selected to work in conjunction with the water channel to ensure prompt and relatively even spreading of water into the water channel and water distribution assembly, in one example, the sheet drain. This water feed pipe may run along the entire length of the water distribution system, or it may run just a partial way. There could also be multiple header pipes that supply multiple feed pipes positioned on and/or around the water distribution assembly. The water feed pipe may be placed anywhere on or adjacent the sheet drain assembly. In addition to or alternatively to the water feed pipe placed along all or a portion of the high side of the sheet drain assembly, the water feed pipe may be placed on either or both ends of the assembly along all or a part of that length. The water feed pipe may be placed on top of or underneath the drain sheet assembly. A purpose is to improve where the water can reach the drain assembly and be dispersed across its full length, width and height dimensions.

The drain pipe may likewise be positioned in one or several places anywhere in a cell or on the water distribution assembly. If the cell structure is engineered to be sloped, as in most but not all structures, then the drain may be advantageously placed on the lower side of the cell. In one example, the drain is placed next to the water distribution system to advantageously drain water back to a water level sensor quickly for rapid feedback. However, the drain may be placed anywhere in the cell. The drain pipe requires at least one opening to allow water to run into it and drain out. However, it is believed that multiple openings, for instance a perforated pipe, is a good choice for a drain pipe in the cell.

Once the sheet drains (water distribution assemblies) are positioned and ready, and in order to both hold water and serve as a base for the fine particle top layer, screened aggregate, or stone screenings, are used at a depth of about 3-6 inches, or alternatively about 4-5 inches. In one example, about 4 to 4½ inches of stone screenings are used. The spaces around the stone are the pockets where water can flow and also be stored. The use of 4 to 4½ inches is less than typical courts that have deeper cells. The reduced requirement for stone screenings to 4" to 4½" of thickness helps to bring down installation costs as well as water consumption making this a desirable court in areas that are prone to drought and water restrictions.

Next is the addition of the top layer of fine particles that make up the surface of the court. In one example, this can be crushed basalt at a depth of about one inch, or alternatively about ¼ to 3 inches. The thickness of this layer may vary depending on the court environment and the intended court usage.

A control system is used to house all controls needed to operate the water maintenance for a tennis court. The cabinet is a physical box that contains all system control parts so that the system is ready for a "Plug & Play" scenario. The control cabinet will be located proximate a court, and in one example, outside of a tennis court fence, on the low side of the court near a water source and electrical source. Within the box are six water level reservoirs. These reservoirs may be in the shape of a round cylinder, but they may be any shape including rectangular or otherwise so that they hold water. This example assumes a six cell court hydration system. Each reservoir contains a water level sensor that displays the water level for each individual cell on the control panel found, in one example, in the hood of the cabinet. Each level sensor is operatively connected to the control panel. This control panel in conjunction with the readings of the level sensor and the programming is used to set the proper water levels per cell for the court. This cabinet will arrive on a job site with minimal work to be performed within the cabinet. The cabinet requires out of the cabinet plumbing to hook in to the six return lines and six feed lines extending from the court, water and electricity. The cabinet must be installed based on the bottom of the water reservoir. The water reservoirs need to be at a specified depth, exactly 3" below the lowest point in the lowest cell, in one example. These reservoirs are housed within the cabinet so the mounting will need to account for this to be accurate.

The water source will be connected to the water control system already within the box through a main feed pipe with a water pressure reducer installed. The present sub-irrigated system is designed with a pressurized water source going into the water control boxes and allowing gravity to balance the box and the cell creating the desired water level in the cells. The water source has pressure to feed each cell within the box. For purposes of a pressurized water supply example, pressurized water supply means one psi or greater, or alternatively three psi or greater, or alternatively five psi or greater, or still further alternatively 10 psi or greater. In any event, this water pressure supply will be greater than any conventional gravity feed system. A range of pressures includes about one to 100 psi, or in another example, five to sixty psi. A supply pipe is feeding in to each cell and each water distribution assembly (2) within each cell, with a return line on the low side of each cell feeding back to the control box.

An alternative way of measuring the supply of water to a cell is measured in water flow. The amount of water flow into a cell will depend on water pressure and the size of the water supply piping. Using a one inch pipe, a water pressure of 1 psi will result in a water flow rate of about 5 gallons per minute. The same one inch pipe under three psi of water pressure will feed about 8-10 gallons per minute. The same one inch pipe under five psi of water pressure will feed about 12 gallons per minute. A 50 psi water pressure in a one inch pipe will supply about 38-40 gallons per minute. Accordingly, the system described herein may supply about five gallons per minute or more to a sub-irrigated tennis court system, or alternatively about eight gallons per minute or more, or alternatively about 12 gallons per minute or more, or still further alternatively about 38 gallons per minute or more.

A level sensor is mounted in each reservoir to measure the level of water in the reservoir and consequently the cell. The level sensor will then tell a digital electronic master controller when to turn the water source solenoid on and off as desired. The digital electronic master controller is designed to be user friendly and comprehensive in order to make water adjustments. The water level in the water level reservoirs will determine the water levels in each cell as the court becomes saturated and finds its balance. This design allows the water from a pressurized source to quickly respond by pushing water into the system. As the cell water level rises, the return keeps the water level in the reservoir at the same level as the cell which in return allows the water level sensor to relay water level to the master digital controller which then activates the system.

A water level sensor is housed in the water level control reservoir. This controls the level of water in the cell. The water level sensor tells the master digital controller to turn on or off the water source solenoids. Water from a pressured source quickly fills the cell as the return from the cell keeps the water level balanced between the two.

The water feed and water level reservoir and sensor components of the system are separated by the flow of water into the sheet drain assembly. In other words, the water will flow under a court surface before flowing back to the water level reservoir. This means that the hydration system receives a water charge before it is returned to be measured. The water supply and water level reservoir have separate and distinct piping into and out, respectively, of the sub-court sheet drain assembly. This structure improves the speed of hydration and the responsiveness of the water level control.

This electronic control system is an electrical controller with digital readings. This apparatus controls the flow of water and level of water in each individual cell. This control system has the capability to hold information so that it can be set to predetermined settings for seasonal sets. Water level adjustments can be made much easier using this new system. The user can push a button to adjust water levels to his or her desired water level for each of the individual six cells. This electronic control receives information from the water level sensor located in the water level cylinders. The electronic control then turns the solenoid on and off as the water level sensor feeds the water level information to the controller. The electronic controller displays water level presently in the boxes as well as the water level set numbers. This system is much more consistent when determining the most desired water levels for each cell. It will elevate the sub-irrigated court system to a higher standard of intuitive operation. The operation is more user-friendly, quick responding in reaching its set goals as well as enabling the system to have the capability to be controlled from off-site locations, opening up many different levels of service to the industry.

Additional features may include wi-fi capabilities for the electronic controller that will allow off site access to maintaining the water to the court and identify if the court is having any issues with water. A mobile device application may be used to capture data, turn water on and off as needed, and have an option for adding future mechanical maintenance equipment to this box. It becomes the portal that manages the water, maintenance, and capture of data.

Individual water meters may be included for each of the six water source lines to enable users to keep track of water usage for each of the six cells. This allows a court manager to work towards becoming even more water usage fluent and reduce the need for this natural resource as much as possible in areas that suffer from water shortages or drought.

Figure 1:
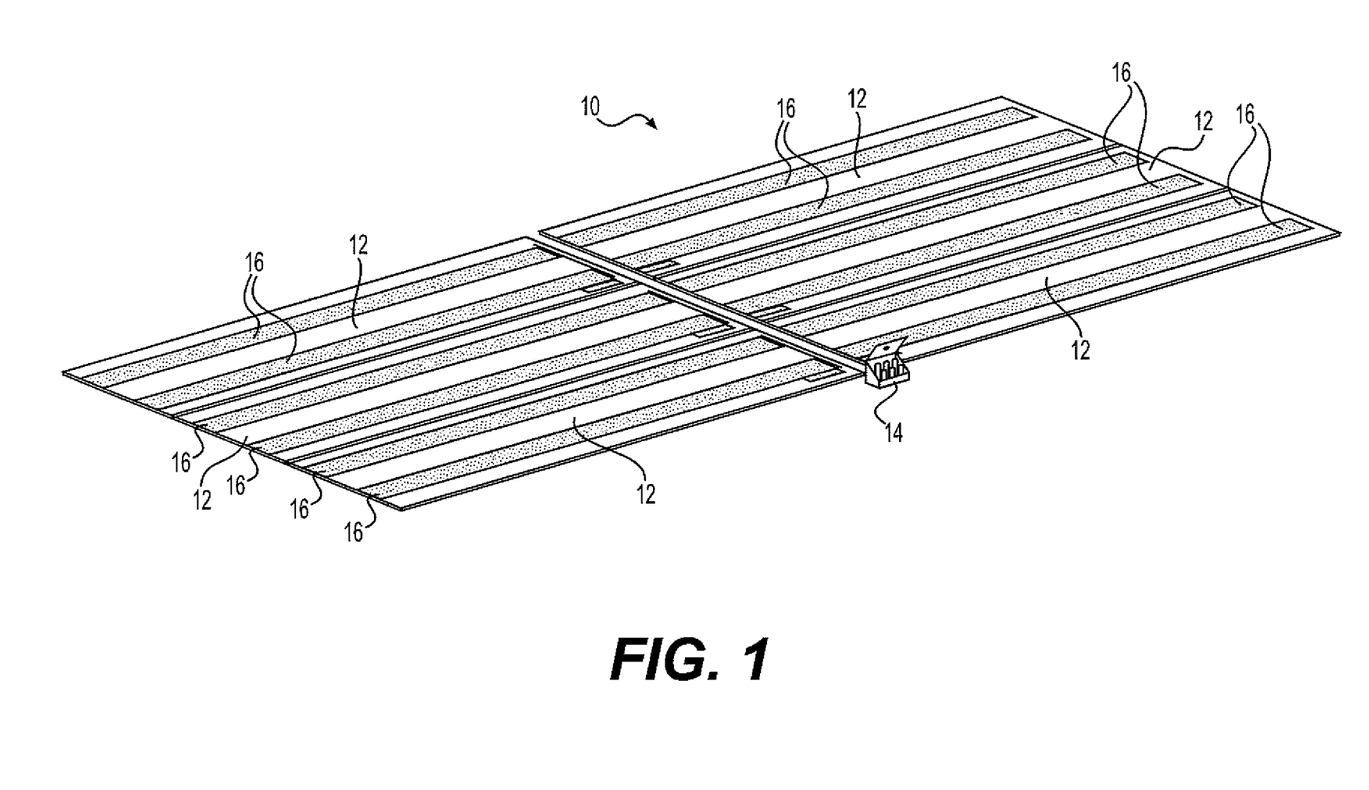
FIG. 1 is a perspective view of six cells as they could be installed in the example of a tennis court hydration system.

Turning now to the attached figures, FIG. 1 shows a complete sub-irrigation system 10 as it could be installed under a clay tennis court. In this example, the sub-irrigation system 10 is made up of six cells 12. Each cell 12 includes two sheet drain assemblies 16 mounted in the cell and along the length of the cell. A control box 14 that houses an electronic control system is figuratively shown next to the center of the court that would be over the sub-irrigation system 10. The control box may be set apart more from the cells or may be placed in other relative positions with respect to the court and sub-irrigation system 10 depending on court layouts and architectural design concerns.

Figure 2:
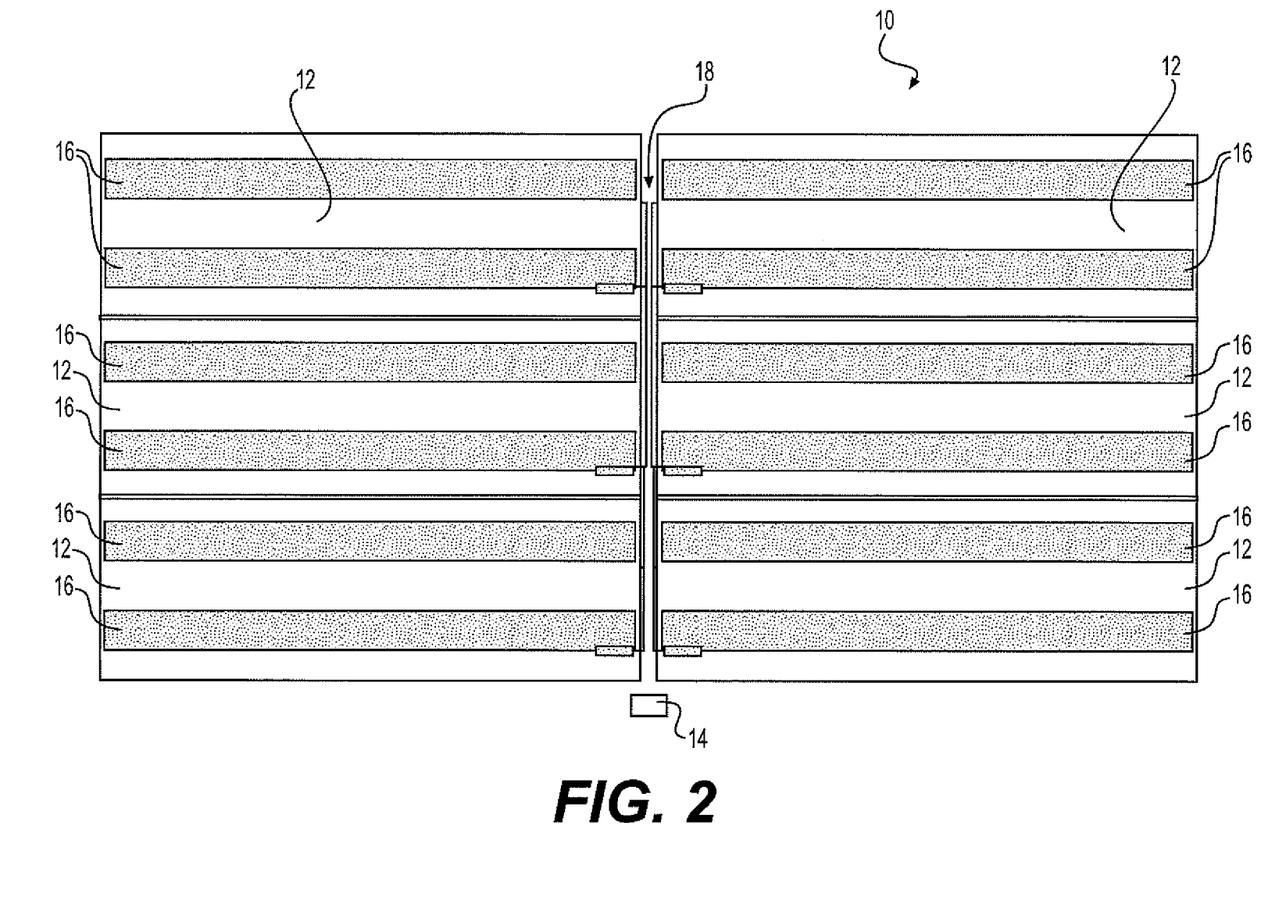
FIG. 2 is a top view of the six cells shown in FIG. 1.

FIG. 2 shows a top view of the sub-irrigation system 10 with the six cells 12 and the two water distribution assemblies 16 in each cell. FIG. 2 also illustrates the center area 18 where all of the water feed pipes and drain pipes will interact with each water distribution assembly 16. This center portion will also be connected to the control box 14 with water feed and water drain piping. This piping will be shown in more detail in other drawings. Depending on the specific engineering of a particular project, the feed and drain piping may be configured in other locations relative to the cells 12 and water distribution assemblies 16. The feed pipes and drain pipes can be placed on opposite ends of the cells, they may be placed in the relative middle of the cells lengthwise, their placement may be asymmetric. There may be a single feed pipe loop that supplies both water distribution assemblies in a cell. The water supply/return lines may also be constructed in a continuous loop such that water in the loop is released from either the perforations in the pipe or other supply outlets connected to the supply pipe. Remaining water in the loop will then be returned to the reservoirs in the control box. The example shown in FIG. 2 is found to be one economical and simple example from an engineering and common installation perspective.

Figure 3A:
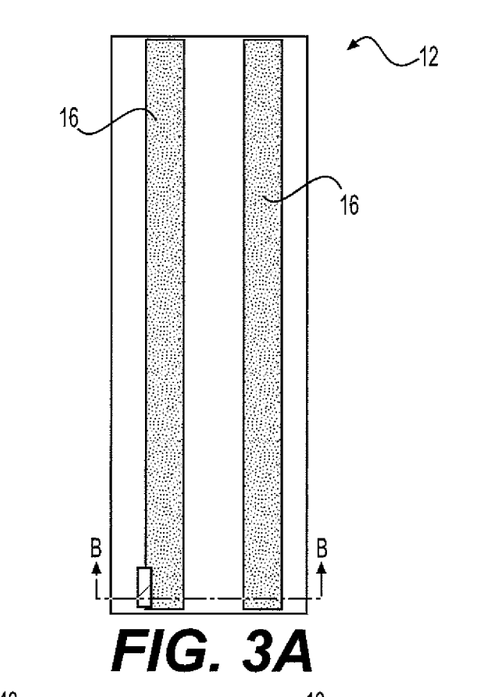
FIG. 3A is a top view of one end of a single cell.
Figure 3B:
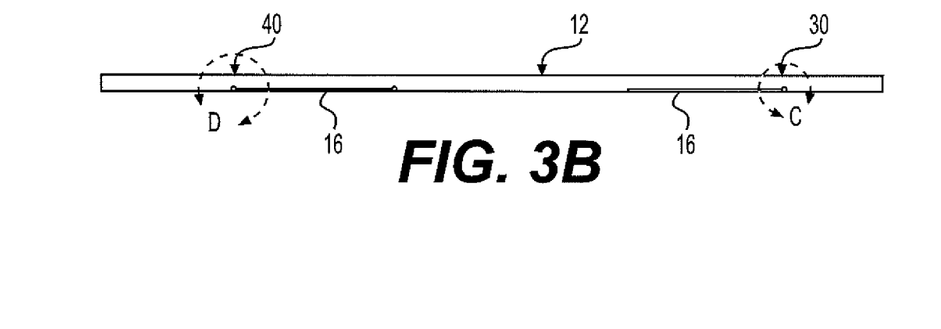
FIG. 3B is a side cross-sectional view of the cell in FIG. 3A taken along lines B-B.
Figure 3C:
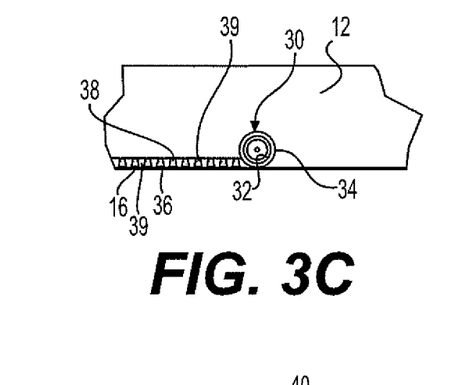
FIG. 3C is the close-up side view of the feed pipe side of the sheet drain.
Figure 3D:
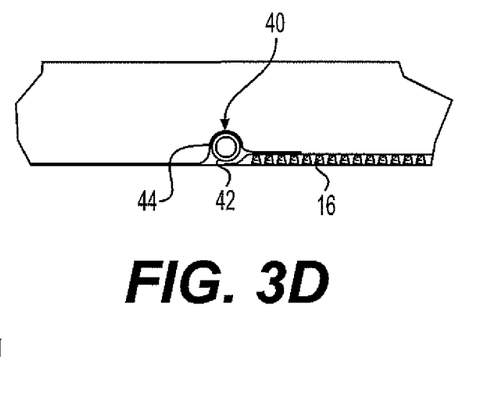
FIG. 3D is a close-up side view of the drain pipe side of the sheet drain.
Figure 3E:
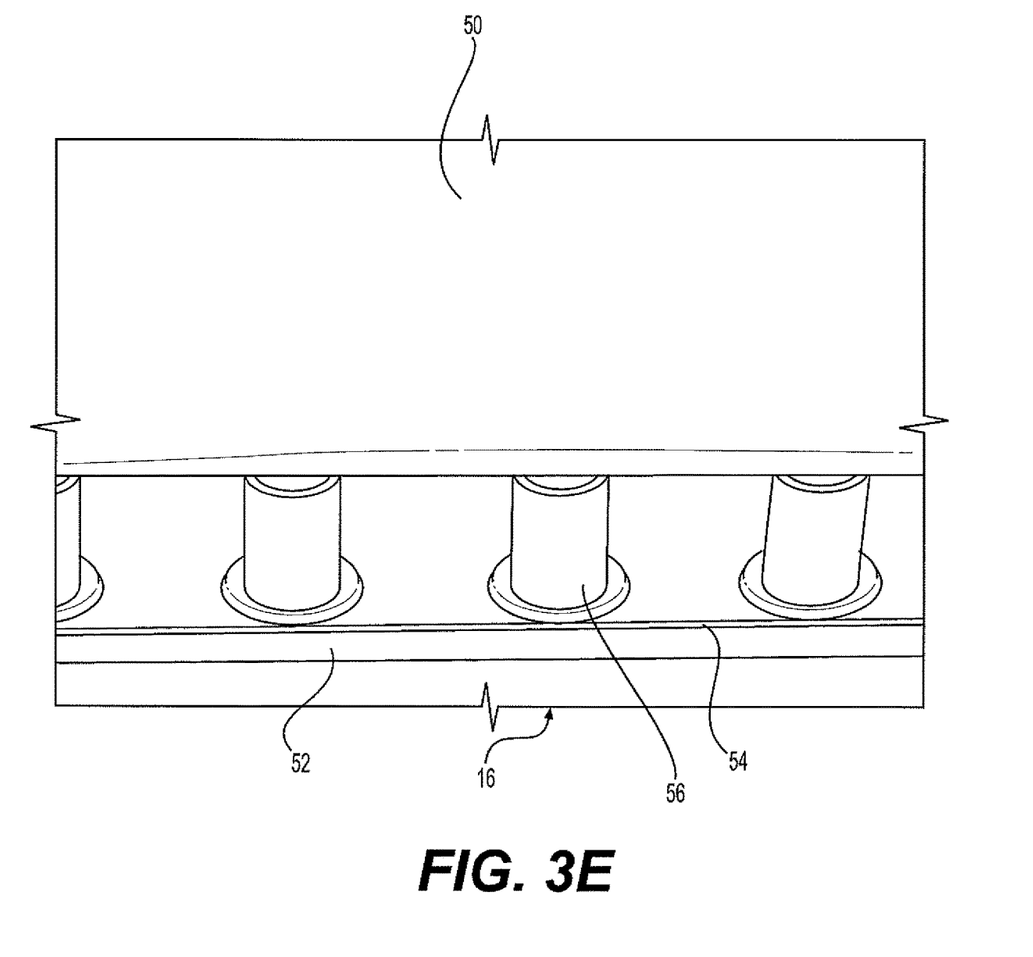
FIG. 3E is a close-up perspective view of a sheet drain construction.

FIGS. 3A-3E illustrate a specific example of a cell 12 and sheet drain assembly 16. In FIG. 3A, the water distribution assemblies 16 are shown extending almost the full length of the cell 12. As already discussed, each water distribution assembly may be shorter and may be wider or more thin relative to the size of a given cell and the circumstances of each installation. As shown in FIG. 3B, the water distribution assemblies 16 are positioned in the bottom of the cell 12. In FIG. 3C, a water supply structure 30 includes a perforated water feed pipe 32 is positioned in a fabric sleeve 34. The water distribution assembly 16 includes a plastic sheet 36 having upwardly extending dimples 39. The dimples 39 carry a permeable fabric sheet 38 on the top of the plastic sheet 36. Water that is fed into the feed pipe 32 freely flows onto the plastic sheet 36 and around the dimples 39 to relatively quickly disperse all across and down the water distribution assembly 16. FIG. 3D illustrates a drain assembly 40 that includes a perforated drain pipe 42 covered by a permeable fabric flap 44. Water in the cell 12 generally and also from the water distribution assembly 16 may flow into the drain pipe 42 where it can be carried from the cell 12. FIG. 3E illustrates the plastic sheet 54 having the dimples 56 extending upwardly therefrom. There is shown a permeable fabric 50 on the top of it and, in this example, also a permeable fabric 52 underneath the plastic sheet 54.

Figure 4A:
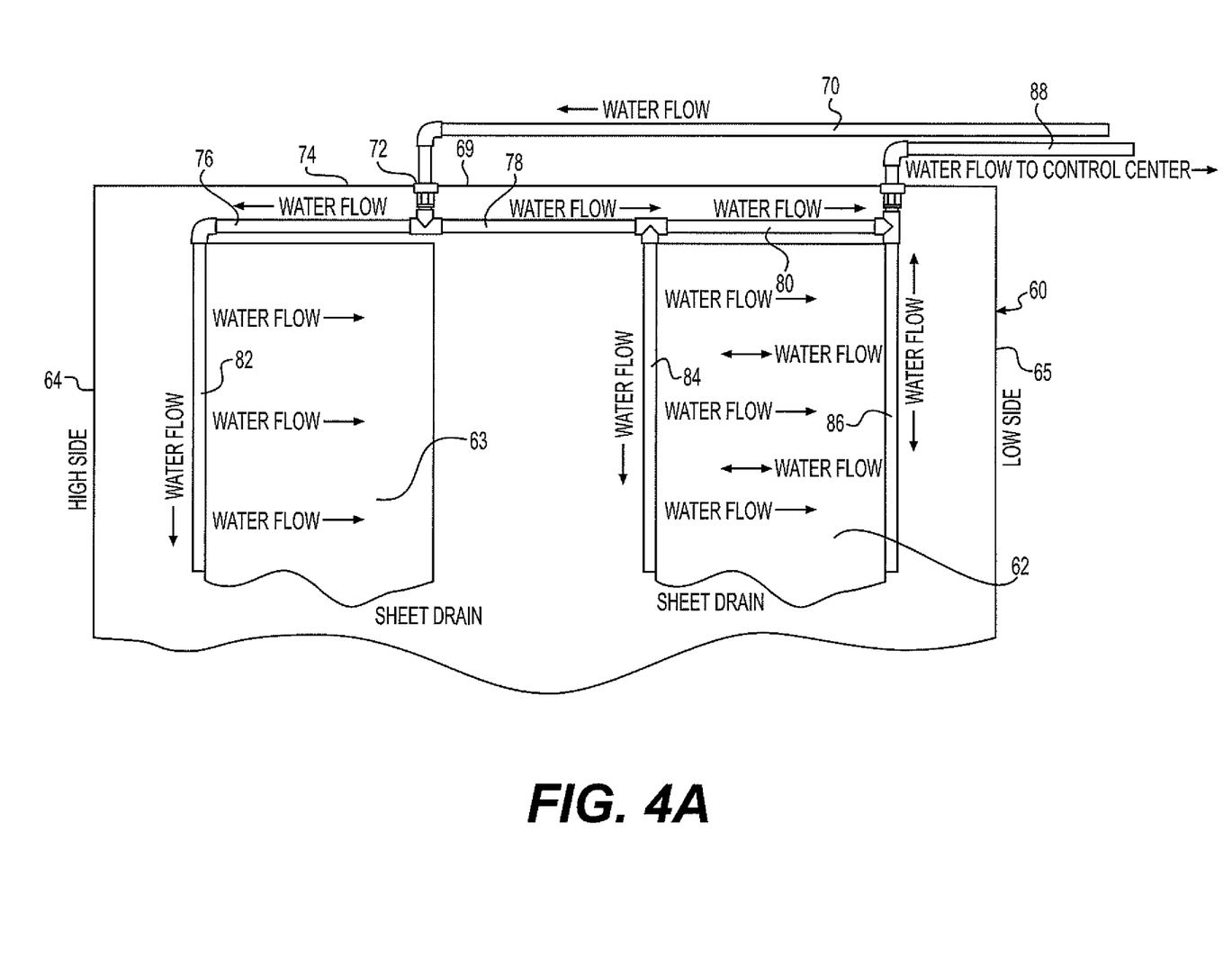
FIG. 4A is a top view of the water flow of one example of the drain sheet assembly.
Figure 4B:
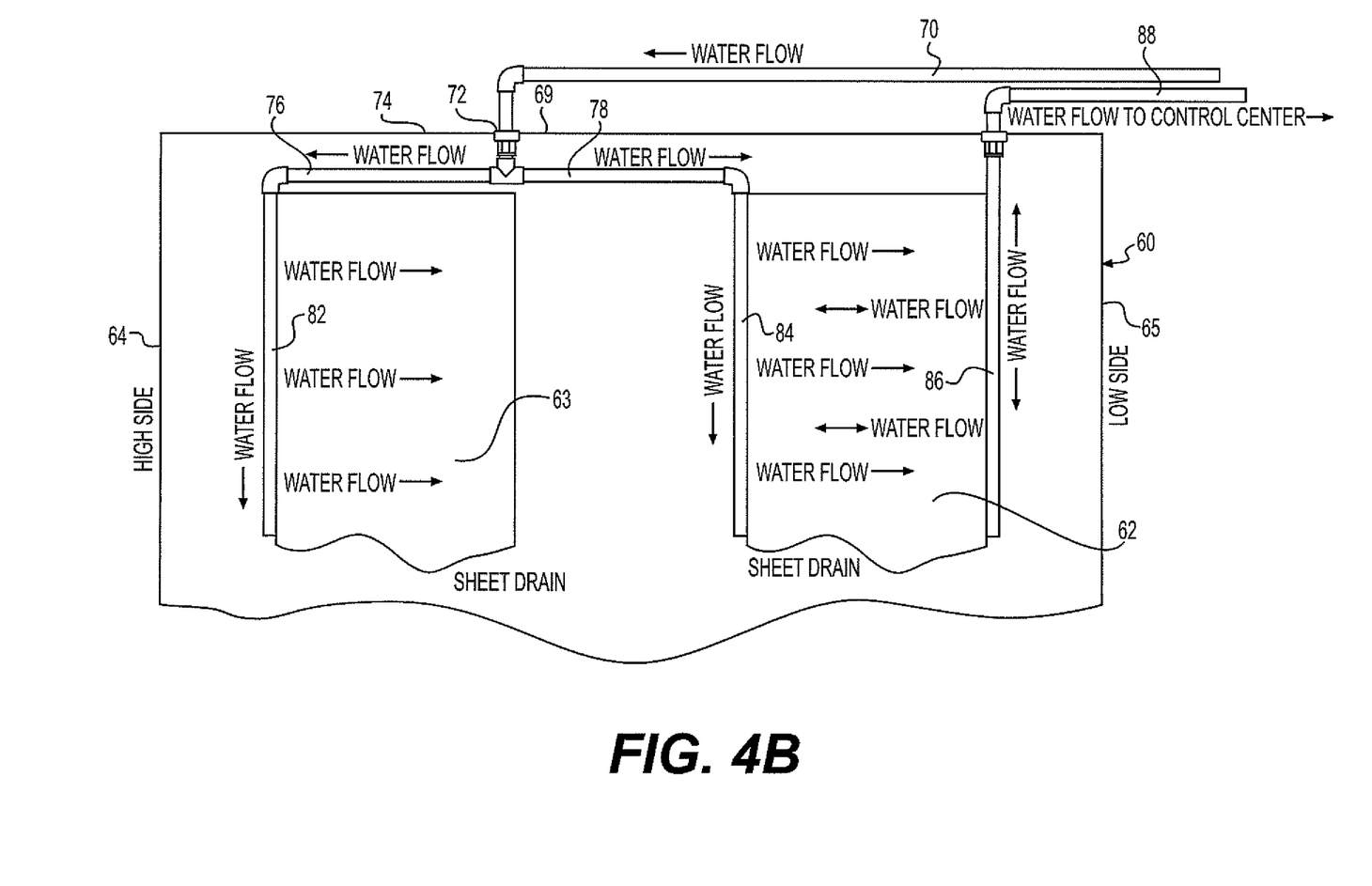
FIG. 4B is a top view of the water flow of another example of the drain sheet assembly.

FIGS. 4A and 4B illustrate the water flow patterns and an example of the plumbing that may be used. There is shown an end portion of a cell 60 with two water distribution assemblies 62 and 63 mounted therein. The cell 60 has a small slope to it to allow excess water to drain off of it. As shown the high side 64 and low side 65 mean that the water will flow by gravity from left to right. A water supply feed pipe 70 is a solid pipe that comes from the water control box (not shown). The water flowing in the supply feed pipe 70 is delivered under pressure. The feed pipe 70 passes through a wall in the cell 69 by way of a bulkhead fitting 72. The feed pipe splits into two separate feed pipes 76 and 78. The feed pipe 76 delivers water to a perforated sheet drain feed pipe 82 that runs the length of the high side of sheet drain 63. Water from this feed pipe 82 will move from left to right across the water distribution assembly 63, and ultimately into the surrounding stone screenings where it is then wicked into the court surface fine materials. Similarly, water travels through feed pipe 78 to the perforated feed pipe 84 that runs the length of the high side of water distribution assembly 62. A perforated water drain pipe 86 is positioned on the low side of the water distribution assembly 62. The drain pipe 86 is connected to a solid drain pipe 88 that leads to the water control box (not shown). Also, solid feed pipe 80 in FIG. 4A leads directly to the perforated drain pipe 86 and solid drain pipe 88. This water pipe 80 means that water will be delivered almost immediately to the water control box, or at least at the same time as the water is fed to water distribution assemblies sheet drains 62 and 63 through feed pipes 82 and 84. This means that the water control box will receive rapid feedback with respect to the water being delivered to the cell 60. In the alternative example of FIG. 4B, there is no water feed pipe that leads directly to the drain pipe. There is no solid pipe like pipe 80 in FIG. 4A. This means that the water must all go through the sheet drains 62 and 63 before reaching the drain pipe 86. In FIG. 4A, it can be seen that water fed in through pipe 80 may go to the drain pipe 86 and back into water distribution assembly 62. Similarly, as water is drained out of the sheet drain into surrounding rock, water may flow back by gravity through the drain pipe 86 back into water distribution assembly 62.

Figure 5:
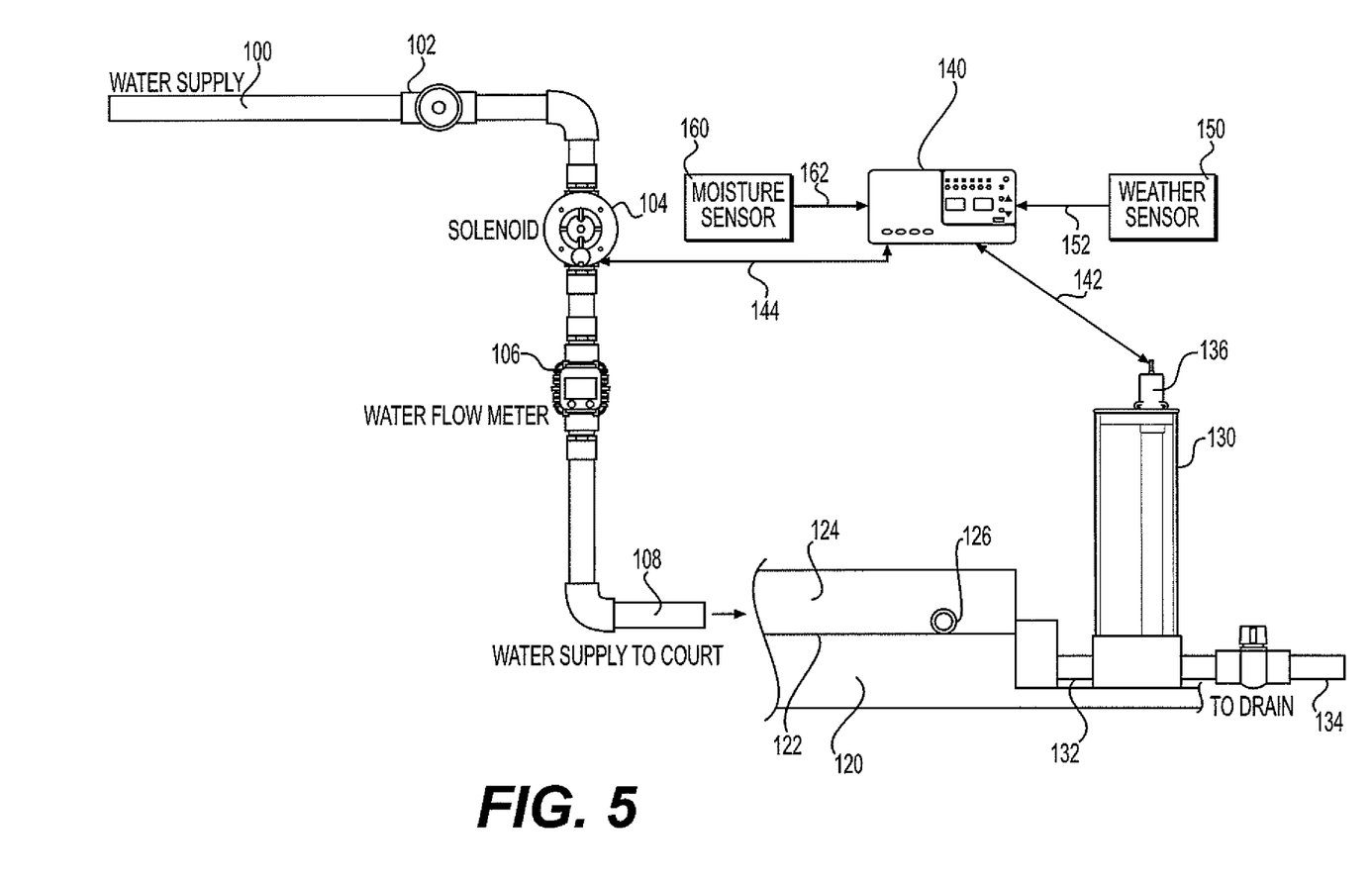
FIG. 5 is a schematic view of the water flow and operation of the sub-irrigation system.

FIG. 5 illustrates in detail the water delivery system and the interaction with an electronic control system. Water originates from a water supply in solid pipe 100. Because water pressure can vary depending on its source, a water flow control 102 allows for a constant and reliable water pressure to be delivered into the sub-irrigation system. After the water flow controller 102, the water is controlled by a solenoid 104 that activates the on/off flow of water. In order to measure the amount of water used by the entire system, a water flow meter 106 can be used. This water flow meter 106 may be placed in line to measure all of the water used by an entire sub-irrigation system, or it may be placed in line to measure the amount used by a single cell in the larger system. Water is then supplied to a court by feed pipe 108. In FIG. 5, the sub-base foundation 120 has a cell liner 122 placed on it and the stone material in the cell 124 placed above the liner. Drain pipe 126 is a perforated pipe that is placed in a cell, in one example on the low side of a cell, to allow water to collect and drain by way of a solid drain pipe 132 to a water level cylinder 130. The water level cylinder 130 has a water level sensor 136 positioned in it to monitor water level in the cylinder, which corresponds to water level in the sub-irrigation system. Optionally a drain 134 may be used if there is too much water in a system.

FIG. 5 also shows the electronic controller 140. The electronic controller is operatively connected to the solenoid 104 to control the on/off with respect to water flow. The electronic controller 140 is also operatively connected to the water level sensor 136. Both with respect to the water level sensor 136 and the solenoid 104, the connection may be a wired or wireless connection. Optionally, the electronic controller 140 may receive additional input from a weather sensor 150 and a moisture sensor 160. The moisture sensor 160 is placed within the court surface material to measure the moisture level in a court.

Figure 6A:
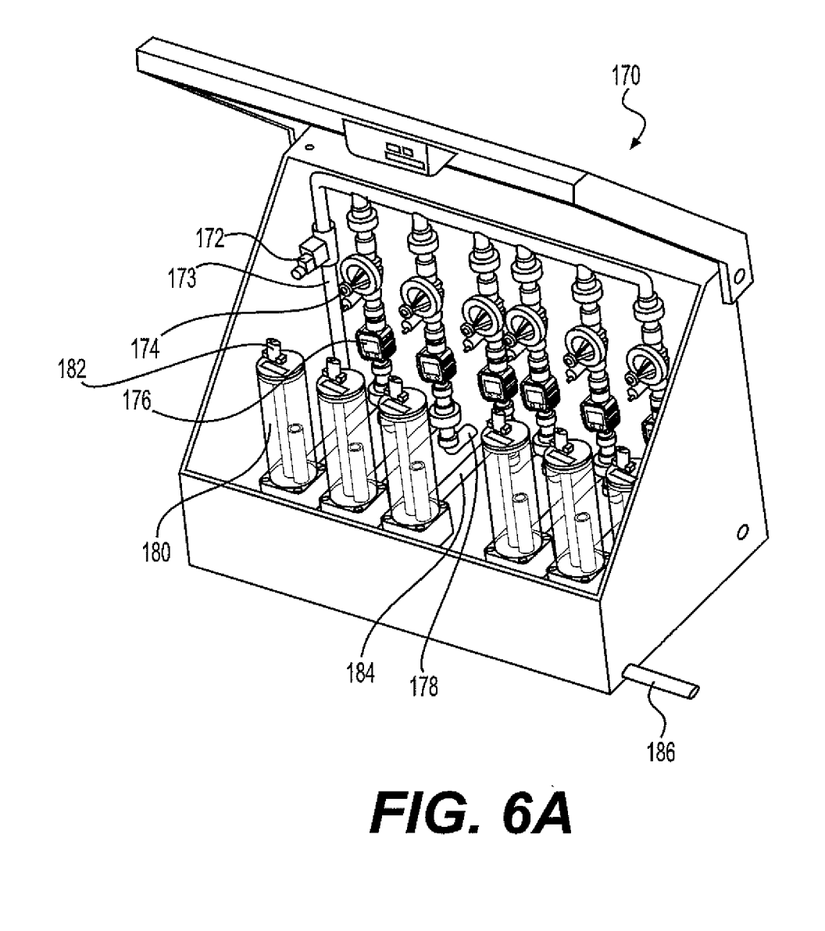
FIG. 6A-C are front perspective, rear perspective and top views respectively of a water control box.
Figure 6B:
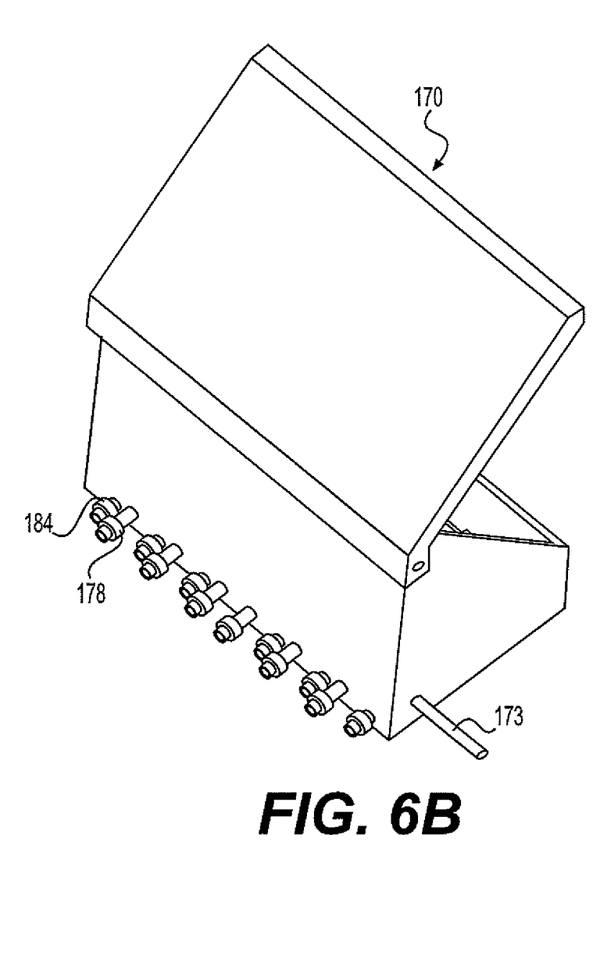
Figure 6C:
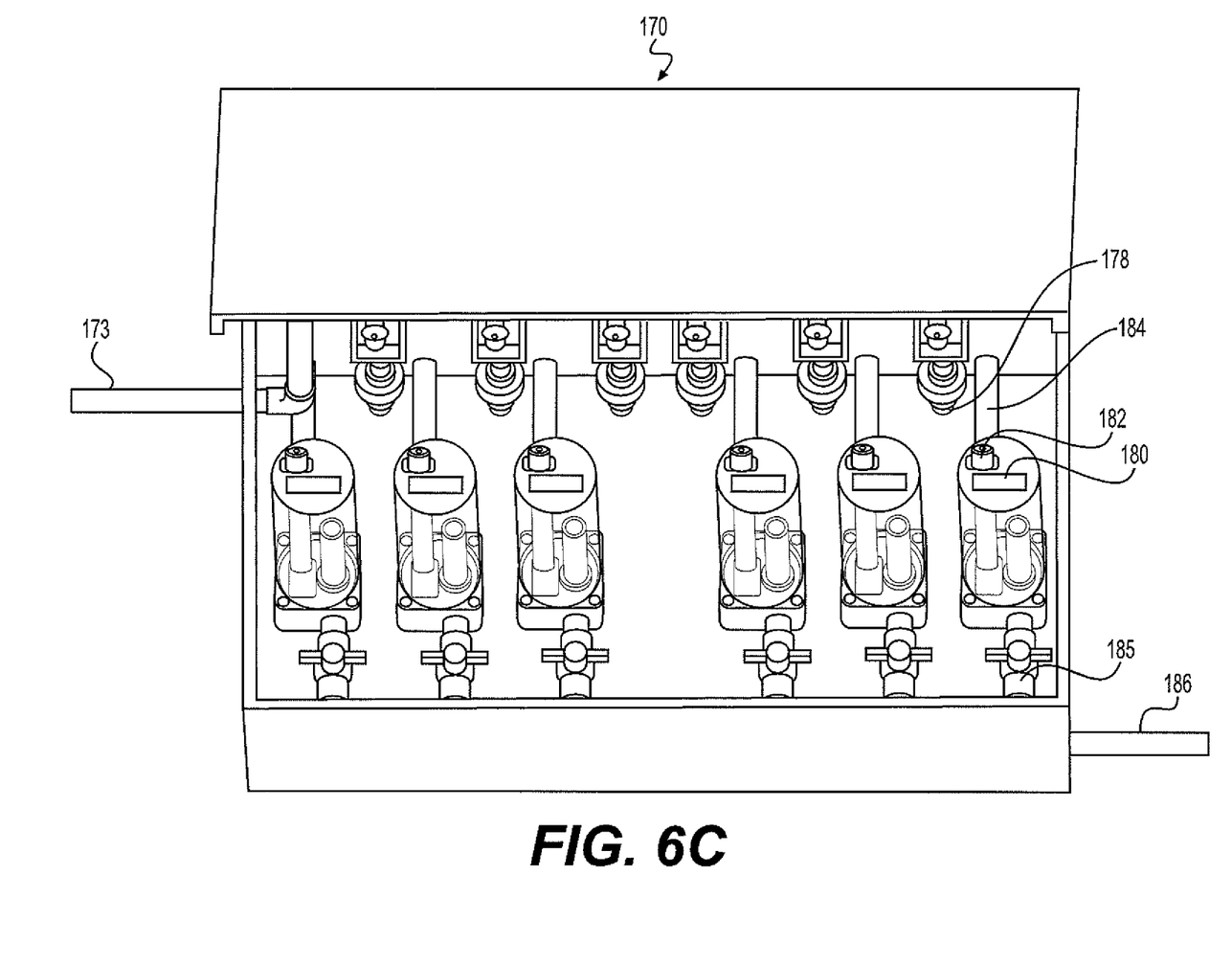

FIGS. 6A-6C illustrate the specific details of an example of a water control box 170. In this system, because there are six cells, there are six water level cylinders 180 with one cylinder connected to each cell. The water supply pipe 173 has water flow controller 172 in line as it feeds the six water supply lines 178. Solenoids 174 are the on/off valves that feed the water into each cell. Water flow meters 176 are also mounted around each individual cell feed line. The water feed lines 178 are seen coming out of the back of the water control box in FIG. 6B. Water returns from the sub-irrigation system through drain lines 184. These drain lines 184 supply water back to the water level reservoirs 180. Water level sensors 182 monitor the water level in each reservoir—from each corresponding cell under the court surface. Drain line 186 removes water from the individual drain connector 185 associated with each water level reservoir 180.

Figure 7:
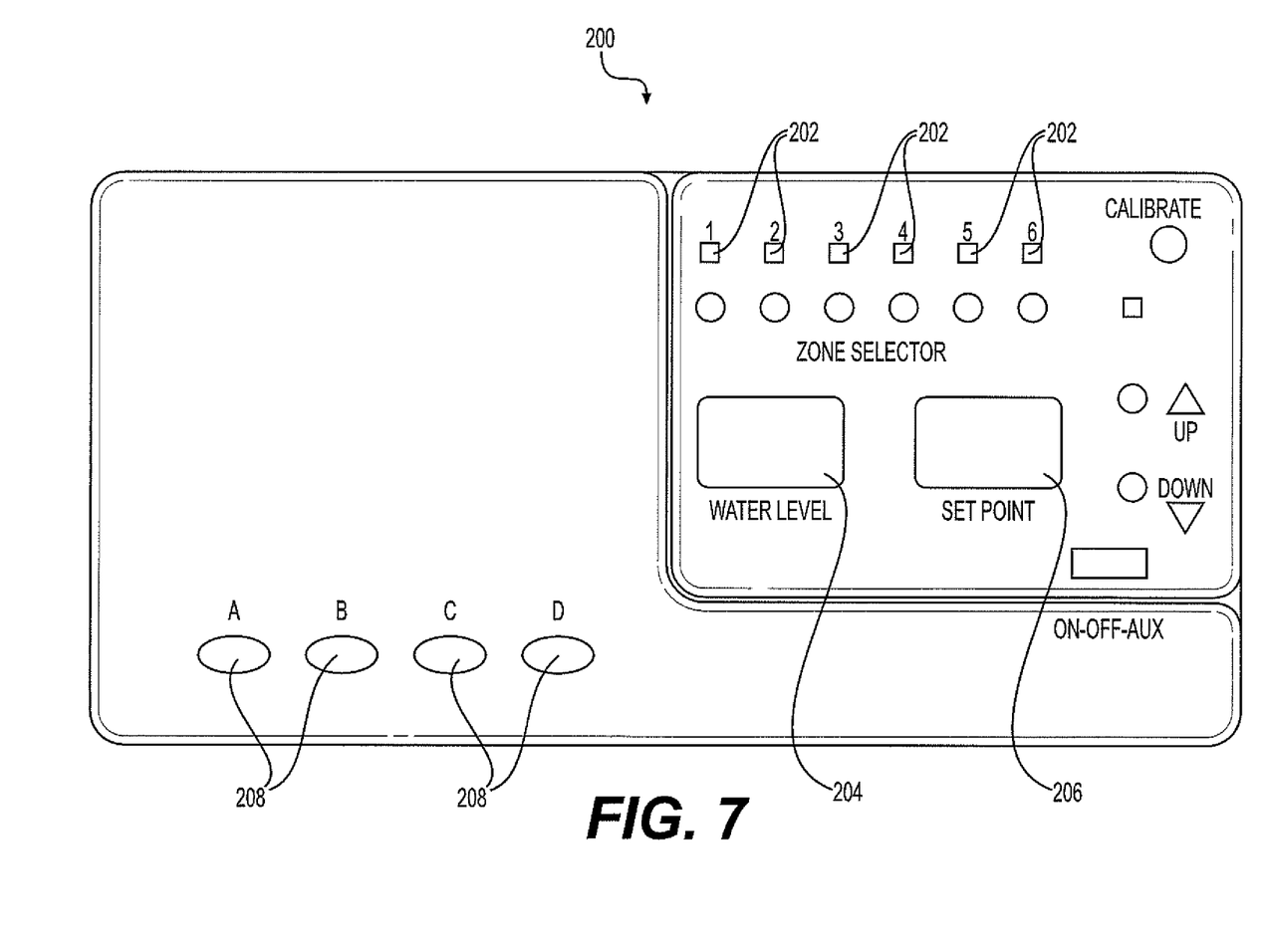
FIG. 7 is a front view of one example of a sub-irrigation system controller input box.

FIG. 7 is a close-up view of the electronic controller interface 200. This interface 200 is shown in the example of a six cell system, with the six cells indicated by the number six lights 202. The water level is shown on screen 204 for a selected cell 202. Similarly, the set point or preset water level is shown on screen 206 so that actual water level 204 can be compared to a preset level. Program buttons 208 are different functions that may be incorporated into the controller processor for such variables as weather and season and their effect on court moisture.

A controller can incorporate learning technologies, which opens the door for a smarter, more modern system that positions itself to progress as technologies progress in the future. This could lead to enhanced data collection which could have the system identify problem cells, shut off water supply to prevent waste and notify maintenance of issues to prevent less down time. The controller could also allow the system to collect resource usage data to track costs, identify means for improving efficiencies, store historical condition/setting data to improve knowledge base for ideal settings based on geography, season, and weather.

This controller can continue to improve functionality by increasing sensor inputs and integration to improve automation, such as, moisture content, future weather conditions, temperature, and humidity. This technology could be combined with level sensor readings to help manipulate conditions. Eventually the system can be fully automated with a self-regulating system, remote control, manufacturer controlled, and portable app control. Learning software could be developed that will learn ideal settings over time and gather data to improve functionality of other courts in similar conditions all in a network of information. Eventually, predictive behavior with smart technology adjusts conditions ahead of known environment changes, predictive rather than reactive, night verses day, high traffic times, upcoming precipitation, and heat/cold waves. These functions provide feedback or suggestions to maintenance staff or automatically control the system and reduce resource consumption by avoiding flooding, reducing evaporation, limiting water use during non-operational times.

Other embodiments of the present invention will be apparent to those skilled in the art from consideration of the specification. It is intended that the specification and Figures be considered as exemplary only, with a true scope and spirit of the invention being indicated by the following claims.

That which is claimed is:

1. A sub-irrigated clay playing surface system comprising:
   a clay playing surface comprising a cell, wherein the cell includes a substantially watertight reservoir and the reservoir is lined on its bottom and sides with a water impermeable layer;
   a water distribution assembly having a water channel, a top permeable fabric flap, and a water feed pipe;
   wherein the water channel is a three-dimensional sheet having an open structure that enables free flow of water therethrough;
   wherein the water channel is positioned under the permeable fabric flap, and wherein the water feed pipe is positioned adjacent and feeds water into the water channel once the water distribution assembly is placed on the bottom of the cell reservoir;
   a layer of screened aggregate placed in the cell and on and around the water distribution assembly and up to a substantially uniform height above the water distribution assembly, wherein the screened aggregate is large enough that there is empty space in between the stones of the screened aggregate through which water may flow; and
   a top layer of fine particles through which water may be dispersed by capillary action.

2. A sub-irrigated clay playing surface system as described in claim 1,
   wherein the water distribution assembly further comprises a fabric sleeve fixed to a length along a side of the water distribution assembly, and wherein the water feed pipe is positioned inside the fabric sleeve.

3. A sub-irrigated clay playing surface system as described in claim 1,
   wherein the cell is sloped so that the cell has a high side and a low side;
   further comprising a drain pipe positioned in the cell on the low side of the cell.

4. A sub-irrigated clay playing surface system as described in claim 1,
   wherein the three-dimensional sheet has a flat base and upwardly extending dimples.

5. A sub-irrigated clay playing surface system as described in claim 1,
   wherein the cell is sloped so that the cell has a high side and a low side;
   wherein the water feed pipe is positioned on the high side of the water feed assembly;
   further comprising a drain pipe that is positioned in the cell on the low side of the cell.

6. A sub-irrigated clay playing surface system as described in claim 1,
   wherein the water feed pipe is a perforated pipe.

7. A sub-irrigated clay playing surface system as described in claim 3,
   wherein the drain pipe is a perforated pipe.

8. A sub-irrigated clay playing surface system as described in claim 1, wherein the clay playing surface comprises a plurality of cells, and each cell has a water distribution assembly positioned therein.

9. A sub-irrigated clay playing surface system comprising:

a clay playing surface comprising a cell, wherein the cell includes a substantially watertight reservoir and the reservoir is lined on its bottom and sides with a water impermeable layer;

a water distribution assembly positioned in the cell and having a water channel, a top permeable fabric flap, and a water feed pipe;

wherein the water channel is a three-dimensional sheet having an open structure that enables free flow of water therethrough;

wherein the water channel is positioned under the permeable fabric flap, and wherein the water feed pipe is positioned adjacent and feeds water into the water channel once the water distribution assembly is placed on the bottom of the cell reservoir;

and an electronic control system that opens and closes water flow into the water feed pipe to control the amount of water delivered to the water distribution assembly.

10. A sub-irrigated clay playing surface system as described in claim 9, wherein the electronic control system includes a water level sensor in a water level reservoir, wherein the water level reservoir is connected by a return pipe to a drain pipe that is positioned in the cell, and wherein the water level sensor controls water turn off and turn on by sending signals to an electronic controller that in turn sends signals to a solenoid that controls a water supply valve.

11. A sub-irrigated clay playing surface system as described in claim 9, wherein the clay playing surface comprises a plurality of cells, and a corresponding plurality of water distribution assemblies positioned one in each cell.

12. A sub-irrigated clay playing surface system as described in claim 11, further comprising a water usage meter positioned on each water feed line that feeds water to each cell and is operatively connected to the electronic control system.

13. A sub-irrigated clay playing surface system as described in claim 12, wherein the electronic control system includes a memory that stores the amount of water usage by each cell over time.

14. A sub-irrigated clay playing surface system as described in claim 10, wherein the electronic control system is positioned adjacent to the tennis court, and the electronic control system is housed in a cabinet that includes the water level reservoirs.

15. A sub-irrigated clay playing surface system as described in claim 10, wherein the cell is sloped so that the cell has a high side and a low side;

wherein the water feed pipe is positioned on the high side of the water feed assembly;

further comprising a drain pipe that is positioned in the cell on the low side of the cell, and wherein the drain pipe is operatively connected by a return pipe to the water level sensor in a corresponding water level reservoir in the electronic control system.

16. A sub-irrigated clay playing surface system as described in claim 15, wherein the water feed pipe and the water level reservoir are separated by the flow of water into the sheet drain assembly.

17. A sub-irrigated clay playing surface system as described in claim 10, wherein the electronic controller has wi-fi capabilities so that there is off site access to the electronic controller to control the clay playing surface water levels.

18. A sub-irrigated clay playing surface system as described in claim 17, further comprising a mobile device application connected wirelessly to the electronic controller for monitoring and controlling the clay playing surface water levels.

19. A sub-irrigated clay playing surface system as described in claim 18, wherein the mobile device application captures and saves water usage data in the cell.

20. A sub-irrigated clay playing surface system comprising:

a clay playing surface comprising a plurality of cells, wherein each cell includes a substantially watertight reservoir and the reservoir is lined on its bottom and sides with a water impermeable layer;

a water distribution assembly having a water channel, a top permeable fabric flap, and a water feed pipe;

wherein the water channel is positioned under the permeable fabric flap, and wherein the water feed pipe is positioned adjacent and feeds water into the water channel once the water distribution assembly is placed on the bottom of the cell reservoir;

and wherein a water source provides water into the water feed pipe, and the water source is a pressurized source in that the water flow into the water feed pipe is under a pressure greater than 1 psi.

21. A sub-irrigated clay playing surface system as described in claim 20, wherein the water flow is under a pressure greater than 5 psi.

22. A sub-irrigated clay playing surface system as described in claim 20, wherein the water flow is under a pressure greater than 10 psi.

23. A sub-irrigated clay playing surface system as described in claim 20, wherein the water is supplied at a flow rate of at least 5 gallons per minute.

24. A sub-irrigated clay playing surface system as described in claim 20, wherein the water is supplied at a flow rate of at least 12 gallons per minute.

25. A sub-irrigated clay playing surface system as described in claim 20, wherein the water is supplied at a flow rate of at least 38 gallons per minute.

* * * * *